United States Patent
Nishida et al.

(10) Patent No.: US 9,794,446 B2
(45) Date of Patent: Oct. 17, 2017

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Tomoyo Nishida, Yokohama (JP); Hideki Yamasaki, Yokohama (JP); Yoshifumi Bando, Yokohama (JP); Yuichi Kawata, Yokohama (JP); Ryoko Saitoh, Yokohama (JP); Kensuke Okamoto, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/203,319

(22) Filed: Jul. 6, 2016

(65) Prior Publication Data
US 2017/0264786 A1 Sep. 14, 2017

(30) Foreign Application Priority Data

Mar. 11, 2016 (JP) .................................. 2016-048427

(51) Int. Cl.
*G06K 15/00* (2006.01)
*H04N 1/44* (2006.01)
*H04N 1/00* (2006.01)

(52) U.S. Cl.
CPC ....... *H04N 1/4413* (2013.01); *H04N 1/00037* (2013.01); *H04N 1/00925* (2013.01); *H04N 1/4426* (2013.01); *H04N 2201/0094* (2013.01)

(58) Field of Classification Search
CPC .......... H04N 1/443; H04N 1/925; H04N 1/37; H04N 1/4426

(Continued)

(56) References Cited

U.S. PATENT DOCUMENTS

| 5,107,279 A * | 4/1992 | Yamamoto | H04N 1/04 347/261 |
| 2004/0109568 A1* | 6/2004 | Slick | G06F 21/608 380/277 |

(Continued)

FOREIGN PATENT DOCUMENTS

| EP | 0370390 | * | 5/1990 | ............... H04N 1/04 |
| EP | 2927837 | * | 10/2015 | ............. G06F 21/35 |

(Continued)

OTHER PUBLICATIONS

Jul. 31, 2017 Office Action issued in Australian Patent Application No. 2016208391.

(Continued)

*Primary Examiner* — Jerome Grant, II
(74) *Attorney, Agent, or Firm* — Oliff PLC (57) ABSTRACT

An information processing apparatus is provided with a specifying unit, an output control unit, and an event detecting unit. The specifying unit specifies an operator who inputs an output request for outputting an output object. The output control unit controls an output process in accordance with the output request. The event detecting unit detects an event having a possibility that the operator stops immediate output of the output request. Even in a case where the output control unit is instructed from the operator to perform an immediate output process of the output request when the operator is specified and where the operator is specified, the output control unit stops the immediate output process of the output request in a case where the event detecting unit detects the event.

8 Claims, 12 Drawing Sheets

(58) Field of Classification Search
USPC .......................................................... 358/1.14
See application file for complete search history.

(56) References Cited

U.S. PATENT DOCUMENTS

| | | |
|---|---|---|
| 2008/0285802 A1 | 11/2008 | Bramblet et al. |
| 2009/0059276 A1 | 3/2009 | Matsuo |
| 2010/0020355 A1 | 1/2010 | Imai |
| 2010/0214602 A1 | 8/2010 | Moriwaki |
| 2013/0050736 A1 | 2/2013 | Akahira et al. |
| 2014/0365060 A1 | 12/2014 | Yamamoto et al. |
| 2016/0234401 A1 | 8/2016 | Tsuzuki |
| 2016/0371040 A1* | 12/2016 | Idehara ................. G06F 3/1238 |

FOREIGN PATENT DOCUMENTS

| | | |
|---|---|---|
| JP | 2007-047923 A | 2/2007 |
| JP | 2010-199838 A | 9/2010 |

OTHER PUBLICATIONS

Aug. 7, 2017 Search Report issued in European Patent Application No. 16179329.4.

\* cited by examiner

FIG. 4A — PLEASE SELECT FUNCTION TO BE USED / COPY / FAX / SCANNER (MAIL TRANSMISSION) / SCANNER (PC STORAGE)

FIG. 4B — PLEASE SELECT JOB TO BE PRINTED AND PRESS "PRINT" / xxxxxxx.doc / xxxxxxx.ppt / xxxxxxx.xls / PRINT

FIG. 4C — PLEASE INPUT USER ID AND PASSWORD / USER ID / PASSWORD

FIG. 12 is a flowchart that illustrates the process flow of an eighth process flow.

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-048427 filed Mar. 11, 2016.

BACKGROUND

Technical Field

The present invention relates to an information processing apparatus, an information processing method, and a non-transitory computer readable medium.

SUMMARY

An aspect of the invention provides an processing apparatus which is provided with a specifying unit that specifies an operator who inputs an output request for outputting an output object, an output control unit that controls an output process in accordance with the output request, and an event detecting unit that detects an event having a possibility that the operator stops immediate output of the output request. Even in a case where the output control unit is instructed from the operator to perform an immediate output process of the output request when the operator is specified and where the operator is specified, the output control unit stops the immediate output process of the output request in a case where the event detecting unit detects the event.

BRIEF DESCRIPTION OF DRAWINGS

Exemplary embodiment(s) of the present invention will be described in detail based on the following figures, wherein.

DETAILED DESCRIPTION

Hereinafter, exemplary embodiment(s) of the invention will be described in detail with reference to drawings.

<Configuration of Information Processing Apparatus>

Figure 1:
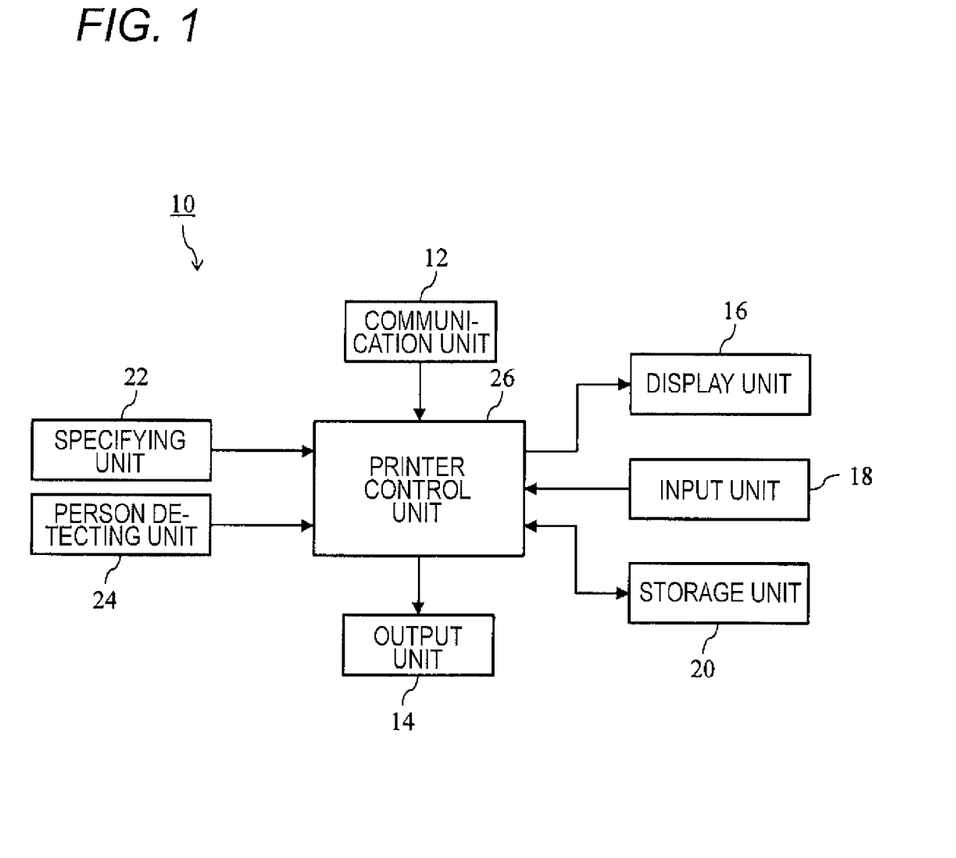
FIG. 1 is a schematic diagram that illustrates the configuration of an image forming apparatus according to an exemplary embodiment.

FIG. 1 illustrates a schematic diagram that illustrates the configuration of an information processing apparatus according to an exemplary embodiment. The information processing apparatus according to this exemplary embodiment is an image forming apparatus 10 such as a multifunction device. The image forming apparatus 10 performs a print process (output process) of a print job as an output request input from a user. The image forming apparatus 10 has an immediate print mode in which, in a case where a user is authenticated, a print process of a print job input by the user is immediately (without requesting the user to perform an additional operation) performed as an operation mode. In this exemplary embodiment, while a user sets whether or not the immediate print mode is applied for each print job, for example, all the input print jobs for which the operation mode of the image forming apparatus 10 is fixedly set to the immediate print mode by a service personnel or the like may be processed as if the immediate print mode is designated by the user.

A communication unit 12, for example, is configured with a communication interface or the like and is used for connecting the image forming apparatus 10 to a communication line. The communication unit 12 receives a print job from a user terminal used by the user through the communication line. As the communication unit 12 receives a print job, the print job is input to the image forming apparatus 10.

The print job is used for requesting the image forming apparatus 10 to perform a print process of print target data that is an output object. In the print job, in addition to information (for example, image data or the like) representing the content of the print target data, attribute data representing the attribute of the print job is included. In the attribute data, user information representing a user who has input the print job, a data amount of the print job, the number of prints, input time at which the print job is input, information representing a security level as a degree of secrecy, and an immediate print flag representing that the print job is to be printed in the immediate print mode, and the like are included.

An output unit 14, for example, is configured to include toner, a photosensitive drum, a sheet feeding unit, and the like and functions as a printer. The output unit 14 forms an image or characters represented by print target data included in the print job on a print medium such as a sheet.

A display unit 16, for example, is configured with a liquid crystal panel or the like. On the display unit 16, various kinds of information relating to the image forming apparatus 10 are displayed.

An input unit 18, for example, is configured to include a touch panel disposed on a liquid crystal panel, buttons, and the like. The input unit 18 is used for a user to input an instruction to the image forming apparatus 10.

A storage unit 20, for example, is configured with a ROM, a RAM, or the like. In the storage unit 20, a program used for operating each unit of the image forming apparatus 10 is stored.

A specifying unit 22 as a specifying unit is configured with an authentication device such as a card reader and is used for specifying a user who has input the print job to the image forming apparatus 10. In this exemplary embodiment, a user who has input a print job causes a card reader that is the specifying unit 22 to read an ID card in which a user ID of the user is stored, and the user is specified by collating the user ID read by the card reader and user information included in the attribute data of the print job with each other. In addition, as an authentication method, other than the method of reading the ID card, for example, a method that allows a user to input an ID and a password may be used. A result of the specification performed by the specifying unit 22 is transmitted to a printer control unit 26 to be described later.

A person detecting unit 24 as a person detecting unit detects a person present in the vicinity of the image forming apparatus 10. Specifically, it is detected whether or not a person (any other person) other than the user who has input the print job is present in the vicinity of the image forming apparatus 10. As the person detecting unit 24, for example, a camera or various sensors can be used.

As a person detecting method using a camera, a camera constantly photographing the vicinity of the image forming apparatus 10 is installed, and it can be detected that a person is present in the vicinity of the image forming apparatus 10 in a case where the person is shown in the camera. For example, by comparing a background image predetermined in advance with an image photographed by the camera, an object that is not included in the background image but is included in the photographed image can be detected as a person. According to this method, the number of persons present in the vicinity of the image forming apparatus 10 can be detected as well.

In addition, by performing face authentication based on face images acquired by photographing faces of persons using a camera, a user and other persons can be discriminated from each other. Alternatively, it may be configured such that lines of sights of persons are photographed using a camera, and a user and other persons are discriminated from each other based on the extending directions of the detected lines of sights. In a case where an infrared camera is used as the camera, it may be configured such that skeletons of persons are detected from an image photographed by the infrared camera, and a user and other persons are discriminated from each other based on the detected skeletons. In addition, in a case where a user is authenticated by the specifying unit 22, when two or more persons are detected through an analysis of an image photographed by a camera, it can be detected that at least one person other than the user is present in the vicinity of the image forming apparatus 10.

As the various sensors, a human detection sensor that detects persons and the number thereof using an infrared ray or an ultrasonic wave, a temperature sensor that detects persons and the number thereof by detecting body temperatures, a sound sensor that detects persons and the number thereof by detecting footsteps, a weight sensor that is arranged on the floor face in the vicinity of the image forming apparatus 10 and detects persons and the number thereof based on the weights on the floor face, and the like may be used.

A result of the detection acquired by the person detecting unit 24 is transmitted to the printer control unit 26.

The printer control unit 26 functions as an output control unit that controls a print process of an input print job based on a program stored in the storage unit 20. The printer control unit 26 operates in the immediate print mode when a print job to which an immediate print flag is set is input.

The printer control unit 26 functions also as a processing amount detecting unit that detects the processing amount of a print process of an input print job. The printer control unit 26 detects the processing amount of the print process of the print job based on information representing a data amount or the number of prints of the print job that is included in the attribute data of the print job.

The printer control unit 26 functions also as a secrecy detecting unit that detects a security level of a print job. The printer control unit 26, based on information representing a security level included in the attribute data of a print job, detects the security level of the print job.

The printer control unit 26 functions also as an elapsed time measuring unit that measures an elapsed time after the input of a print job. The printer control unit 26 measures an elapsed time after the input of a print job based on information representing input time of the print job that is included in the attribute data of the print job and a time counting function of the image forming apparatus 10.

Also in a case where a print job to which the immediate print mode is designated by the user, in other words, a print job having the immediate print flag as its attribute data is input, and the user is specified, in a case where an event having a possibility that the immediate print process of the print job is stopped by the user occurs, the printer control unit 26 as the output control unit stops the immediate print process of the print job.

When a user transmits a print job to which the immediate print mode is designated by using a user terminal, there are cases where there is a precondition for performing the immediate print process of the print job although the user may not be aware of the precondition. The precondition, for example, is a condition of desiring not showing a printed material to other persons or immediately using a printed material. There are cases where the precondition changes after the transmission of the print job. For example, there is a case where any other person comes to the vicinity of the image forming apparatus 10 or a case where an immediate use of a printed material becomes unnecessary. As above, in a case where the user's precondition for performing the immediate print process changes, in other words, in a case where an event having a possibility that the user stops the immediate print process of the print job occurs, the printer control unit 26 stops the immediate print process of the print job.

The printer control unit 26 determines whether or not at least one of the presence/absence of any other person in the vicinity of the image forming apparatus 10 and the attribute of the print job satisfies an immediate output stop condition determined in advance, thereby determining whether or not an event having a possibility that the user stops the immediate print process of the print job occurs. In other words, as an event detecting unit that detects an event having a possibility that the user stops the immediate print process of the print job, the person detecting unit 24 that is the person detecting unit described above, a processing time estimating unit, the secrecy detecting unit, and the printer control unit 26 as the elapsed time measuring unit are configured to be included. Details of the immediate output stop condition will be described later.

For example, in a case where the immediate output stop condition is a condition that a person (other person) other than the user who has input the print job is present in the vicinity of the image forming apparatus 10, the printer control unit 26, in a case where the person detecting unit 24 detects any other person in the vicinity of the image forming apparatus 10, determines that the immediate output stop condition is satisfied, in other words, detects an event having a possibility that the user stops the immediate print process of the print job and stops the immediate print process of the print job.

In addition, the printer control unit 26, in a case where the immediate output stop condition is satisfied, stops the immediate print process of the print job and displays a print checking screen as an output checking screen used for asking the user whether or not the print job is output on the display unit 16. Accordingly, even in a case where the immediate output stop condition is satisfied, and the immediate print process of the input print job is stopped by the printer control unit 26, by configuring a user's determination of being printable to be prioritized, and the print job can be output. In this way, the printer control unit 26 functions also as a display section that displays the print checking screen on the display unit 16.

Figure 2:
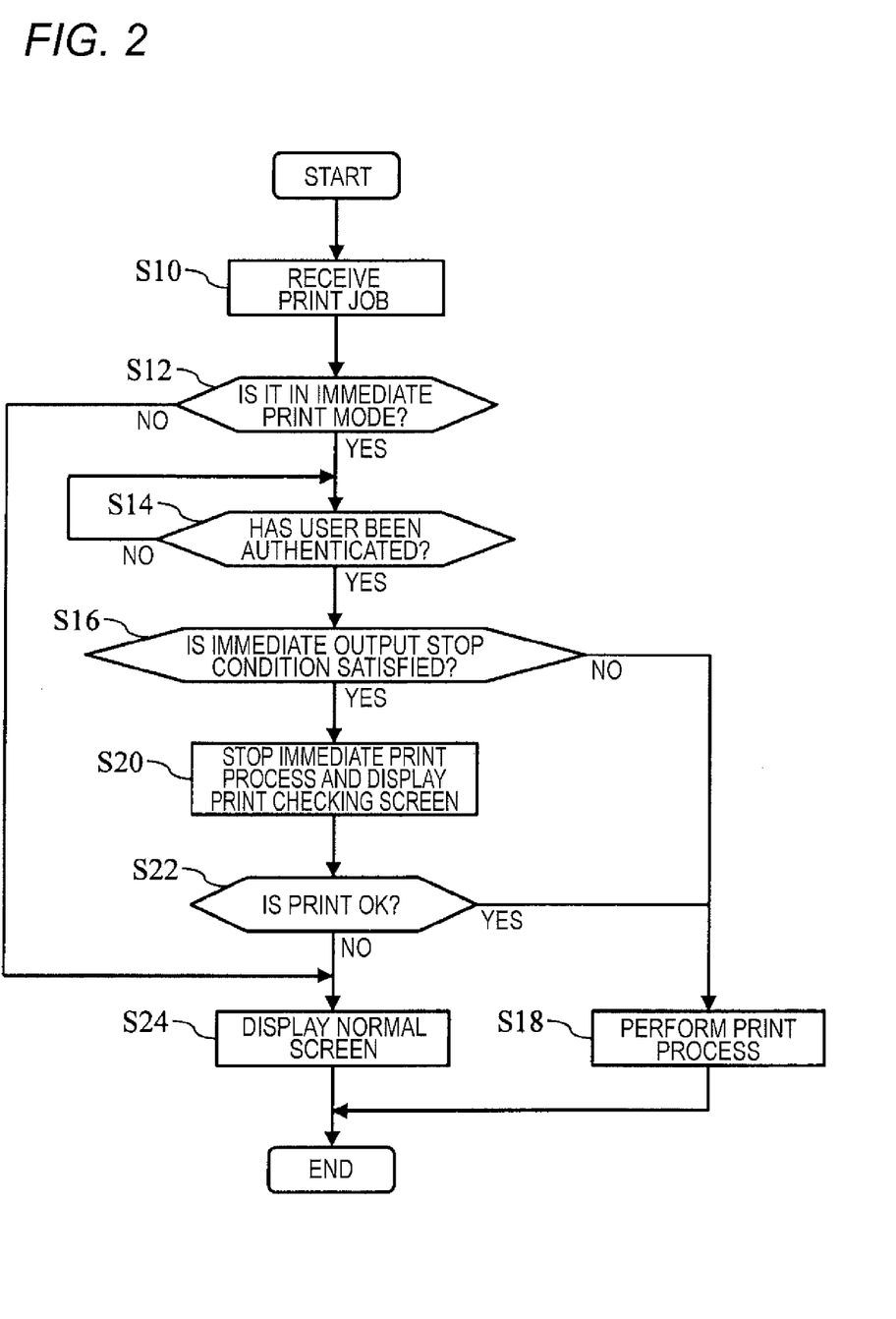
FIG. 2 is a flowchart that illustrates the flow of a basic process performed by the image forming apparatus according to the exemplary embodiment.

Hereinafter, the flow of the basic process performed by the image forming apparatus 10 will be described with reference to a flowchart illustrated in FIG. 2.

In Step S10, a print job is transmitted from the user terminal, and the communication unit 12 receives the print job, whereby the print job is input to the image forming apparatus 10.

In Step S12, the printer control unit 26 determines whether or not the immediate print flag is set to the print job by referring to the attribute data of the input print job. In a case where the immediate print flag is not set to the print job, the process proceeds to Step S24, and the printer control unit 26 displays a normal screen (to be described later) on the display unit 16 without performing an immediate print process of the input print job. On the other hand, in a case where the immediate print flag is set to the print job, the process proceeds to Step S14.

In Step S14, the printer control unit 26 determines whether or not a user who has input the print job is specified by the specifying unit 22. In case of a specified state, the process proceeds to Step S16.

In Step S16, the printer control unit 26 determines whether or not at least one of the presence/absence of any other person in the vicinity of the image forming apparatus 10 and the attribute of the print job satisfies an immediate output stop condition. The immediate output stop condition is set by a service personnel or the like of the image forming apparatus 10 in advance. A specific example of the immediate output stop condition or details of the process flow of the image forming apparatus 10 based thereon will be described later.

In Step S16, in a case where the immediate output stop condition is determined not to be satisfied, the process proceeds to Step S18, and the printer control unit 26 outputs the input print job. In other words, an immediate print process of the print job is performed.

Figure 3:
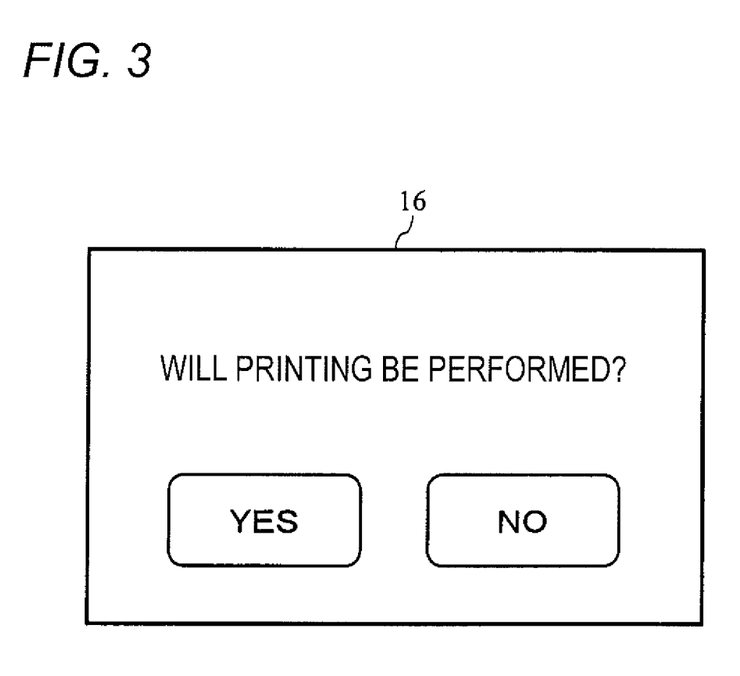
FIG. 3 is a diagram that illustrates an example of a print checking screen.

In Step S16, in a case where the immediate output stop condition is determined to be satisfied, the process proceeds to Step S20, and the printer control unit 26 stops the immediate print process of the print job and displays a print checking screen asking the user whether or not the print job is printed on the display unit 16. FIG. 3 illustrates an example of the print checking screen. In the print checking screen, for example, a Yes button used for giving an instruction for print permission of the print job and a No button used for giving an instruction for print stop of the print job are included.

Referring back to FIG. 2, in Step S22, in a case where the printer control unit 26 detects that the Yes button is pressed by the user, the process proceeds to Step S18, and a print process of the print job is performed.

In Step S22, in a case where the printer control unit 26 detects that the No button is pressed by the user, the process proceeds to Step S24, and the printer control unit 26 displays a normal screen on the display unit 16 without performing the print process of the print job.

Figure 4A:
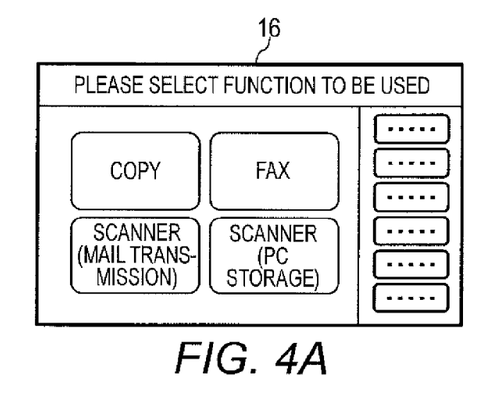
FIGS. 4A, 4B, and 4C are diagrams that illustrate examples of a normal screen.
Figure 4B:
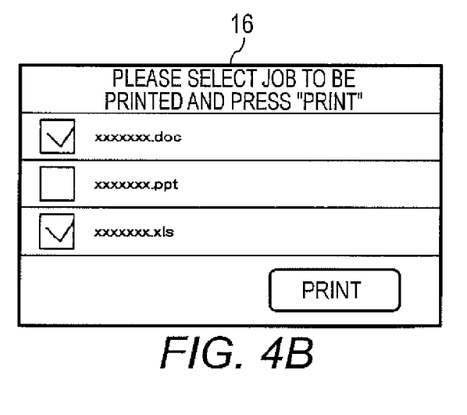
Figure 4C:
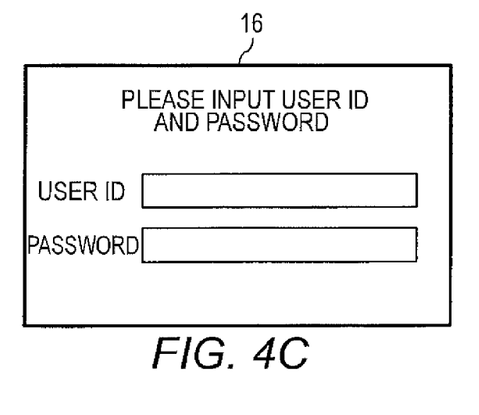

FIGS. 4A to 4C illustrate examples of the normal screen. As the normal screen, as illustrated in FIG. 4A, a function list screen of the image forming apparatus 10 may be used. In addition, after the function list screen is displayed, in a case where the user desires to print the input print job, by performing an operation of the function list screen, the user can give an instruction for a print process of the print job. As the normal screen, as illustrated in FIG. 4B, a screen selecting a print job to be printed may be used. Furthermore, as the normal screen, as illustrated in FIG. 4C, a screen requesting the user to perform re-authentication may be used.

Hereinafter, specific examples of the immediate output stop condition and the process flow of the image forming apparatus 10 of a case where each immediate output stop condition is set will be described with reference to flowcharts illustrated in FIGS. 5 to 12. In description presented with reference to FIGS. 5 to 12, a same step number as that illustrated in FIG. 2 is assigned to a step performing the same process as that of each step illustrated in FIG. 2, and description thereof will not be presented.

<First Process Flow>

Figure 5:
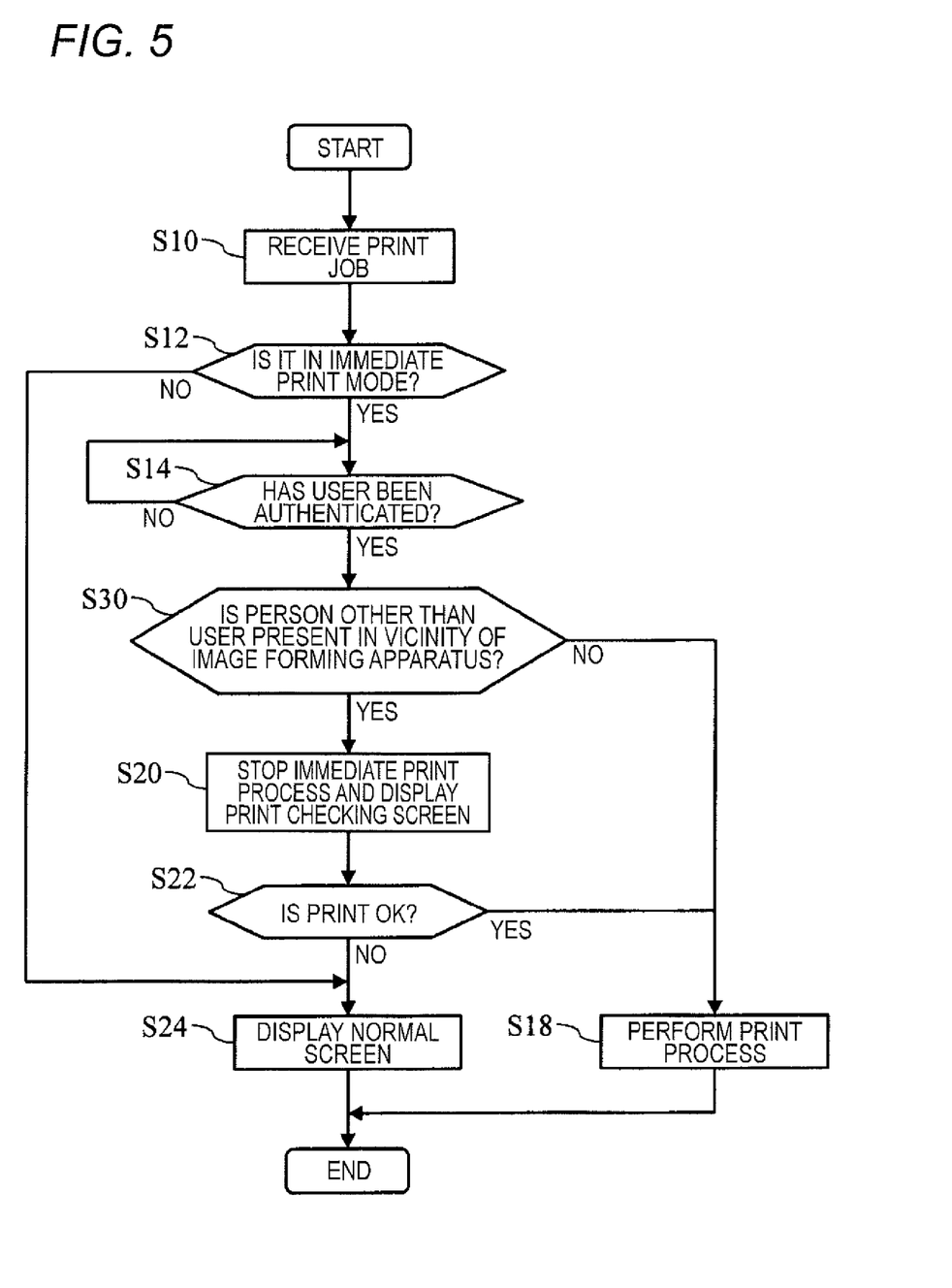
FIG. 5 is a flowchart that illustrates the process flow of a first process flow.

FIG. 5 illustrates a flowchart that illustrates a process flow (first process flow) of the image forming apparatus 10 of a case where a condition that "a person (other person) other than a user who has input a print job is detected in the vicinity (in this case, particularly, in the vicinity of the output unit 14) of the image forming apparatus 10 by the person detecting unit 24" is set as the immediate output stop condition.

In the first process flow, when a print job to which the immediate print mode flag is set is input by a user, and the user is specified, in Step S30, the printer control unit 26 determines whether or not any other person present in the vicinity of the image forming apparatus 10, particularly, in the vicinity of the output unit 14 is detected by the person detecting unit 24. In a case where any other person is present in the vicinity of the image forming apparatus 10, in Step S20, the immediate print process of the print job is stopped, and the print checking screen is displayed. On the other hand, in a case where no other person is present in the vicinity of the image forming apparatus 10, the process proceeds to Step S18, and the immediate print process of the print job is performed.

According to the first process flow, a possibility that a printed material printed by the print job is shown to the other persons can be lowered than that of a case where the immediate print process of the print job is performed.

<Second Process Flow>

Figure 6:
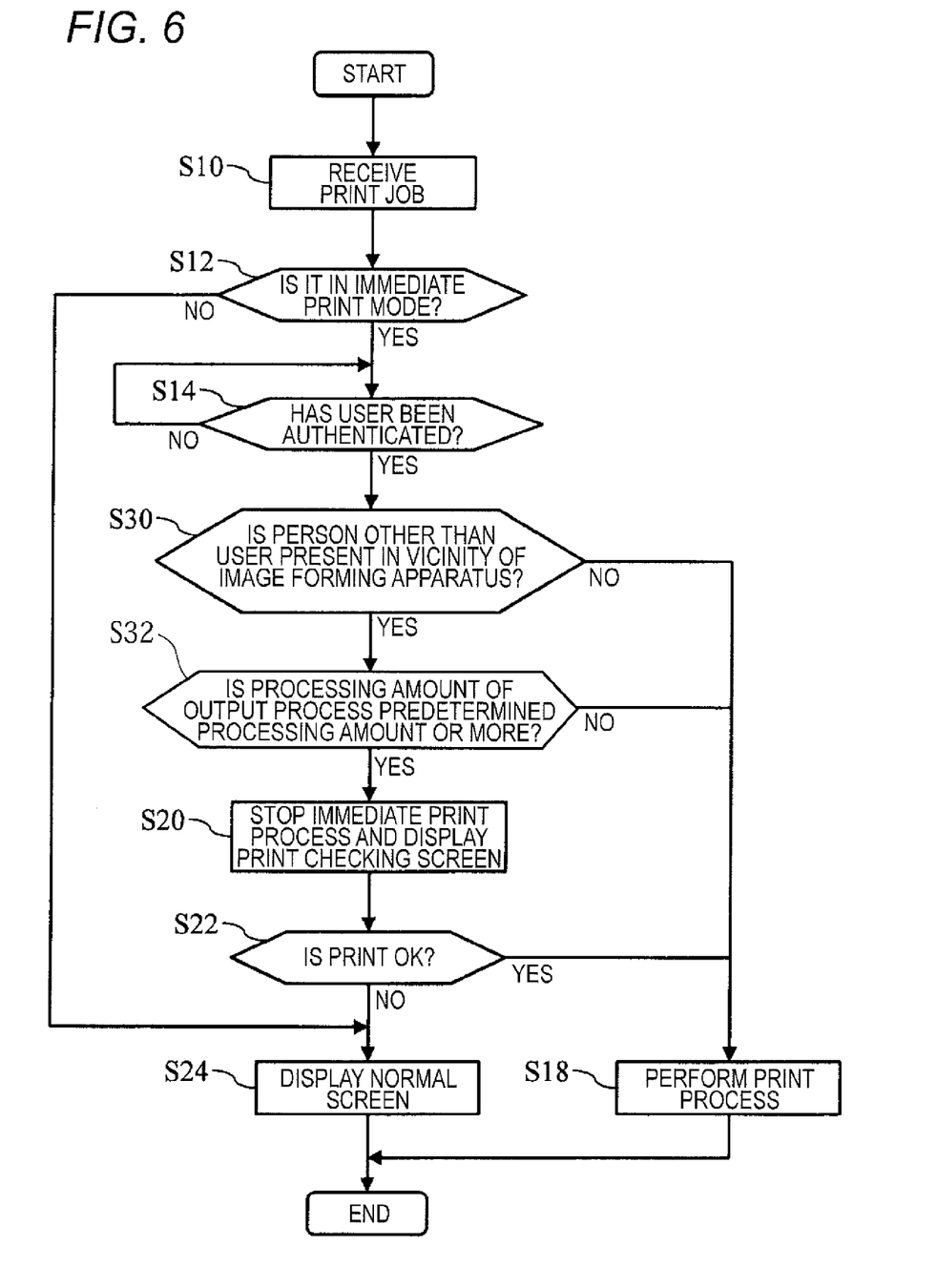
FIG. 6 is a flowchart that illustrates the process flow of a second process flow.

FIG. 6 illustrates a flowchart that illustrates a process flow (second process flow) of the image forming apparatus 10 of a case where a condition that "a person (other person) other than a user who has input a print job is detected in the vicinity of the image forming apparatus 10 by the person detecting unit 24, and the processing amount of a print process of the print job detected by the printer control unit 26 is a predetermined processing amount or more" is set as the immediate output stop condition.

In the second process flow, when a print job to which the immediate print mode flag is set is input by a user, and the user is authenticated, in Step S30, any other person present in the vicinity of the image forming apparatus 10 is detected. In a case where any other person is present in the vicinity of the image forming apparatus 10, additionally in Step S32, the printer control unit 26 determines whether or not the processing amount of the print process of the print job is a predetermined processing amount set in advance or more. For example, the printer control unit 26 refers to the attribute data of the print job and, in a case where the number of prints of the print job is a predetermined number of prints set in advance or more or a case where the data amount of the print job is a predetermined amount set in advance or more, determines that the processing amount of the print process of the print job is the predetermined processing amount or more.

In a case where any other person is present in the vicinity of the image forming apparatus 10, and in a case where the processing amount of the print process of the print job is the predetermined processing amount or more (in other words, in case of "Yes" in Steps S30 and S32), in Step S20, the immediate print process of the print job is stopped, and the print checking screen is displayed. On the other hand, in a case where any one of the two conditions described above is not satisfied (in other words, in case of "No" in any one of Steps S30 and S32), the process proceeds to Step S18, and the immediate print process of the print job is performed.

According to the second process flow, the immediate print process of a print job having a large processing amount and consuming a time for the print process thereof is stopped, whereby any other person desiring to use the image forming apparatus 10 (for example, to use the copying function thereof) can be prioritized to use the image forming apparatus 10 without waiting until the end of the print process of the print job input by the user.

<Third Process Flow>

Figure 7:
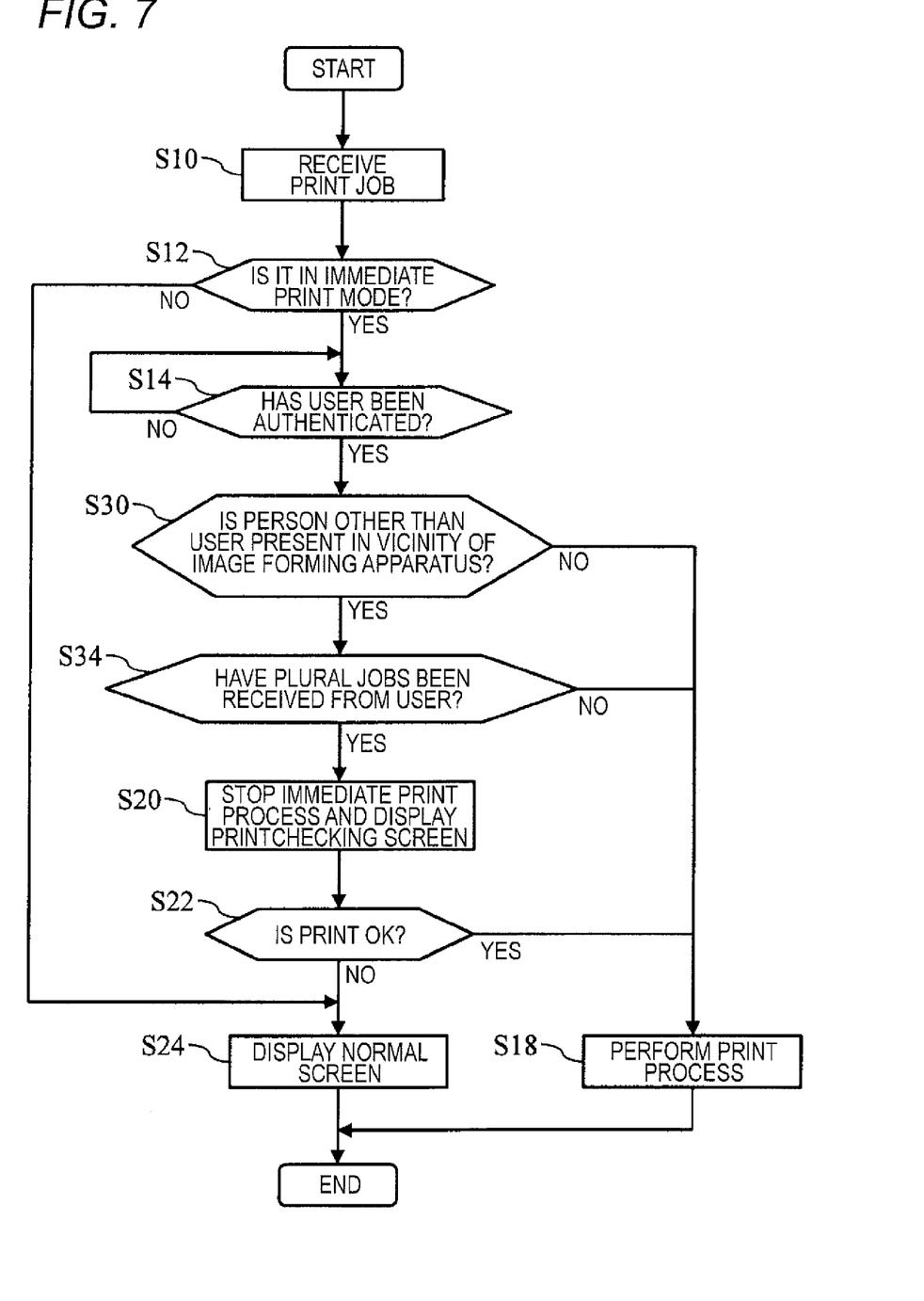
FIG. 7 is a flowchart that illustrates the process flow of a third process flow.

FIG. 7 illustrates a flowchart that illustrates a process flow (third process flow) of the image forming apparatus 10 of a case where a condition that "a person (other person) other than a user who has input a print job is detected in the vicinity of the image forming apparatus 10 by the person detecting unit 24, and plural print jobs are input from the user" is set as the immediate output stop condition.

In the third process flow, when a print job to which the immediate print mode flag is set is input by a user, and the user is authenticated, in Step S30, any other person present in the vicinity of the output unit 14 is detected. In a case where any other person is present in the vicinity of the image forming apparatus 10, additionally in Step S34, the printer control unit 26 determines whether or not plural print jobs in which the immediate print mode is designated are input from the user.

In a case where any other person is present in the vicinity of the image forming apparatus 10, and in a case where plural print jobs are input from the user (in other words, in case of "Yes" in Steps S30 and S34), in Step S20, the immediate print process of the print job is stopped, and the print checking screen is displayed. The print checking screen displayed in this case is a screen (for example, a screen illustrated in FIG. 4B) used for selecting plural input print jobs. On the other hand, in a case where any one of the two conditions described above is not satisfied (in other words, in case of "No" in any one of Steps S30 and S34), the process proceeds to Step S18, and the immediate print process of the print job is performed.

According to the third process flow, while time is consumed for the process in a case where all of the plural print jobs are performed, by stopping the immediate print processes of the plural print jobs, any other person desiring to use the image forming apparatus 10 can be prioritized to use the image forming apparatus 10 without waiting until the end of the print processes of the plural print jobs input by the user. In addition, among the plural print jobs, only a print job of which the immediate print process is necessary is selected by the user, and the immediate print process of only the selected print job is performed, whereby a waiting time of any other person desiring to use the image forming apparatus 10 can be decreased.

<Fourth Process Flow>

Figure 8:
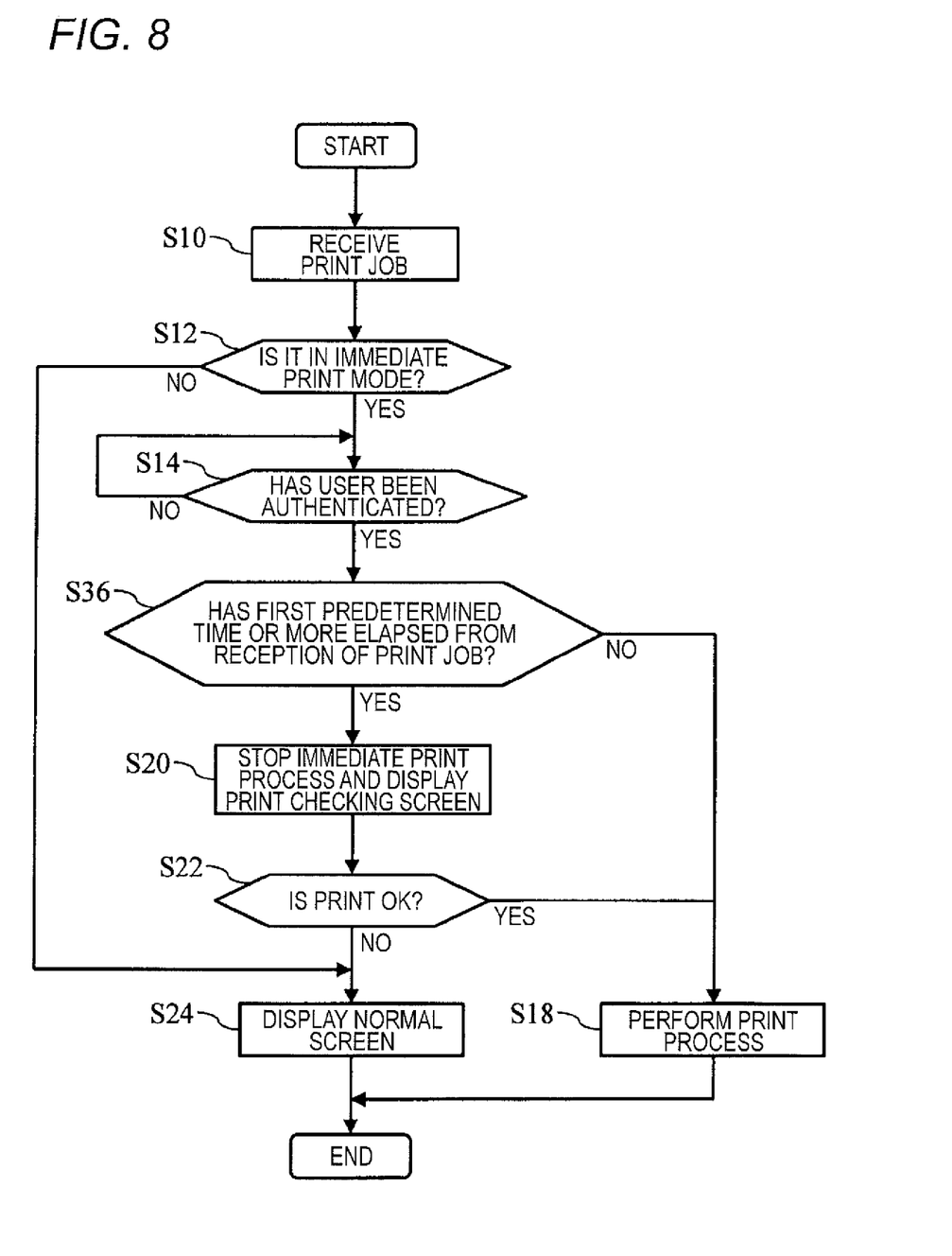
FIG. 8 is a flowchart that illustrates the process flow of a fourth process flow.

FIG. 8 illustrates a flowchart that illustrates a process flow (fourth process flow) of the image forming apparatus 10 of a case where a condition that "an elapsed time after the input of a print job measured by the printer control unit 26 is a first predetermined time or more" is set as the immediate output stop condition.

In the fourth process flow, when a print job to which the immediate print mode flag is set is input by a user, and the user is specified, in Step S36, the printer control unit 26 determines whether or not the first predetermined time or more has elapsed after the input of the print job. The first predetermined time may set as is appropriate. In a case where the first predetermined time or more has elapsed after the input of the print job, in Step S20, the immediate print process of the print job is stopped, and the print checking screen is displayed. On the other hand, in a case where the first predetermined time has not elapsed after the input of the print job, the process proceeds to Step S18, and the immediate print process of the print job is performed.

Even in a case where a user inputs a print job with the immediate print mode designated, in a case where the user is not authenticated for a long time (the first predetermined time or more) and leaves the print job unattended, there are many cases where an immediate print process of the print job does not need to be performed. According to the fourth process flow, in a case where a print job is left to be unattended for a long time, by stopping the immediate print process of the print job, the other processes can be prioritized.

<Fifth Process Flow>

Figure 9:
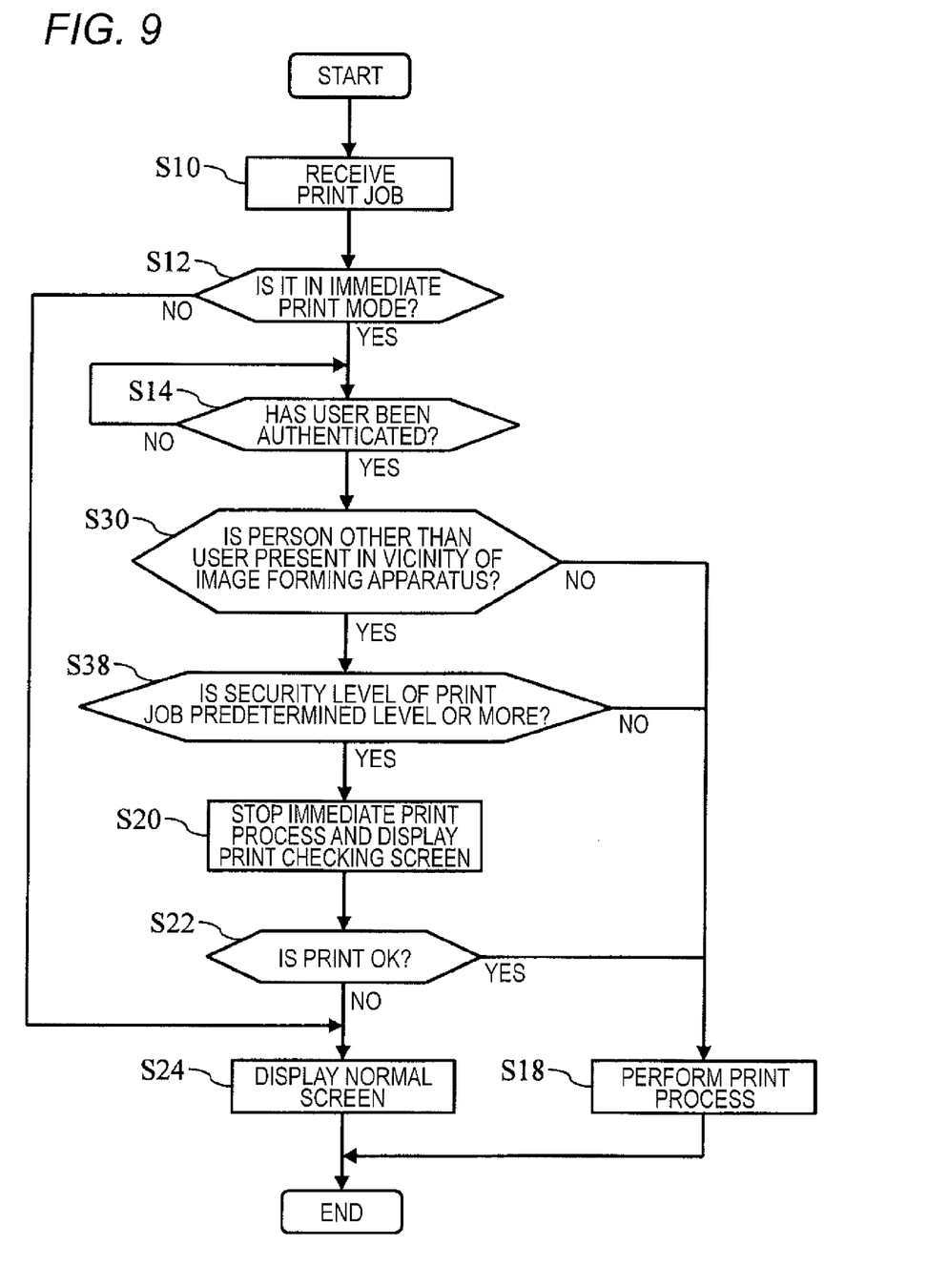
FIG. 9 is a flowchart that illustrates the process flow of a fifth process flow.

FIG. 9 illustrates a flowchart that illustrates a process flow (fifth process flow) of the image forming apparatus 10 of a case where a condition that "a person (other person) other than a user who has input a print job is detected by the person detecting unit 24 in the vicinity of the image forming apparatus 10 (in this case, particularly, in the vicinity of the output unit 14), and the security level of the print job that is detected by the printer control unit 26 is a predetermined level or more" is set as the immediate output stop condition.

In the fifth process flow, when a print job to which the immediate print mode flag is set is input by a user, and the user is authenticated, in Step S30, any other person present in the vicinity of the image forming apparatus 10, particularly in the vicinity of the output unit 14 is detected. In a case where any other person is present in the vicinity of the image forming apparatus 10, additionally in Step S38, the printer control unit 26 determines whether or not the security level of the print job is a predetermined level or more by referring to the attribute data of the print job.

In a case where any other person is present in the vicinity of the image forming apparatus 10, and in a case where the security level of the print job is the predetermined level or more (in other words, in case of "Yes" in Steps S30 and S38), in Step S20, the immediate print process of the print job is stopped, and the print checking screen is displayed. On the other hand, in a case where any one of the two conditions described above is not satisfied (in other words, in case of "No" in any one of Steps S30 and S38), the process proceeds to Step S18, and the immediate print process of the print job is performed.

According to the fifth process flow, a possibility that a printed material having high secrecy is shown to the other persons can be decreased, compared to a case where the immediate print process of the print job is performed.

<Sixth Process Flow>

Figure 10:
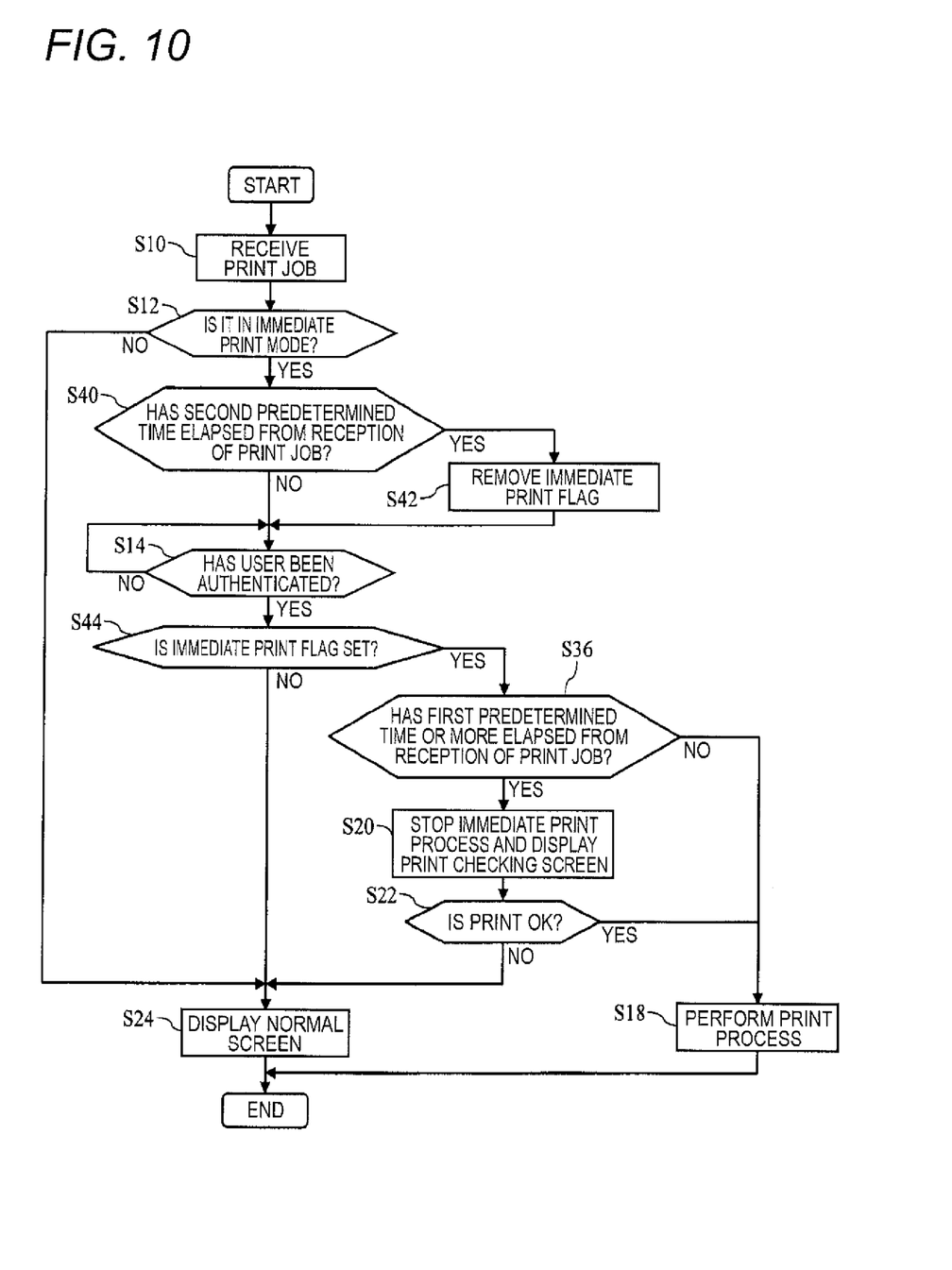
FIG. 10 is a flowchart that illustrates the process flow of a sixth process flow.

A sixth process flow illustrated in FIG. 10 is a modified example of the fourth process flow illustrated in FIG. 8. In the fourth process flow, while, in a case where the first processing time or more has elapsed after the input of a print job, the immediate print process is stopped, and the print checking screen is displayed. However, in the sixth process flow, additionally, in a case where a second processing time that is longer than the first processing time has elapsed, the immediate print flag set to the print job is removed. In other words, the user's instruction for the immediate print mode is cancelled. Accordingly, the print job instructed as the immediate print mode from the user is handled as a print job of a non-immediate print mode.

In the sixth process flow, in a case where a print job to which the immediate print mode flag is set is input by the user, in Step S40, the printer control unit 26 determines whether or not the second predetermined time or more has elapsed after the input of the print job. In a case where the second predetermined time or more has elapsed after the input of the print job, in Step S42, the printer control unit 26 removes the immediate print flag set to the print job.

Thereafter, in a case where the user is authenticated in Step S14, in Step S44, the printer control unit 26 determines whether or not the immediate print flag is set to the print job. In a case where the immediate print flag is set, in Steps S36 and subsequent steps, a process similar to that of the fourth process flow is performed. On the other hand, in a case where the immediate print flag is not set, in Step S24, a normal screen is displayed. In other words, the print job is handled as a print job of a non-immediate print mode.

<Seventh Process Flow>

Figure 11:
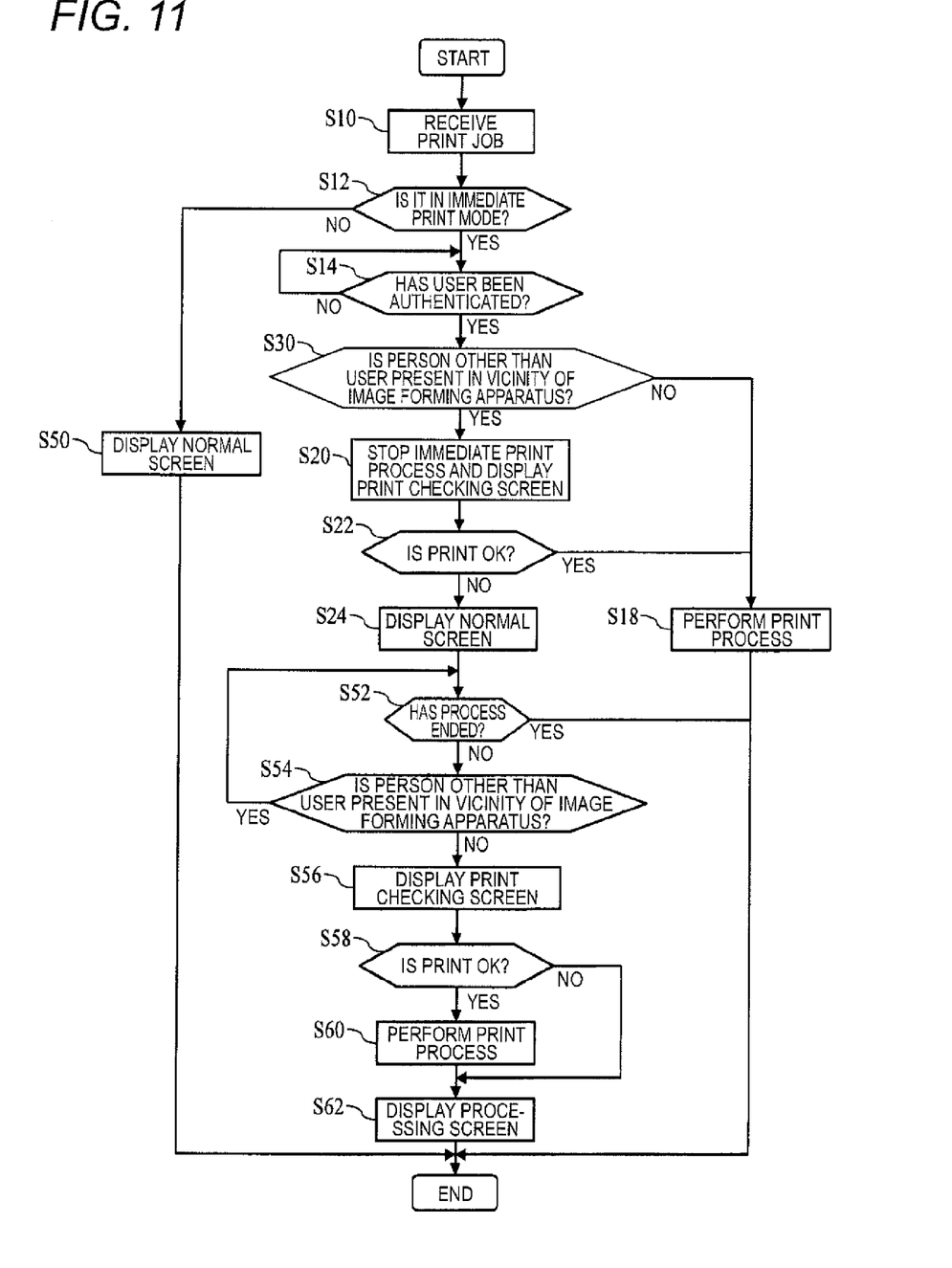
FIG. 11 is a flowchart that illustrates the process flow of a seventh process flow.

A seventh process flow illustrated in FIG. 11 is a modified example of the first process flow illustrated in FIG. 5. In the seventh process flow, even in a case where the immediate print process of the print job is stopped due to the presence of any other person in the vicinity of the image forming apparatus 10, and there is a user's instruction for print stop on the print checking screen, the situation of the vicinity of the image forming apparatus 10 is continuously monitored. Then, in a case where other persons disappear in the vicinity of the image forming apparatus 10, a print checking screen asking the user whether or not the print process of the print job is performed is displayed again.

In the seventh process flow, up to Step S24, a process similar to that of the first process flow is performed. In the seventh process flow, on a print checking screen displayed in Step S20, in addition to a Yes button and a No button, a "Later notification" button is displayed, and, in a case where the "Later notification" button is pressed, the seventh process flow (process of Step S52 and subsequent steps) may be configured to be performed.

After a normal screen is displayed in Step S24, in Step S52, the printer control unit 26 determines whether or not the process of the print job has ended. For example, in a case where the print job is canceled from the user, "Yes" is determined in Step S52, and the process ends.

On the other hand, in a case where the process of the print job has not ended, in Step S54, the printer control unit 26 determines whether or not the person detecting unit 24 detects the presence of any other person in the vicinity of the image forming apparatus 10 again. However, in a case where the other person is continuously present in the vicinity of the image forming apparatus 10, the process is returned to Step S52. In other words, any other person present in the vicinity of the image forming apparatus 10 is continuously monitored until the process of the print job ends. In a case where the other person disappears in the vicinity of the image forming apparatus 10, the print checking screen is displayed again in Step S56. In a case where the Yes button is pressed by the user in Step S58, the print process of the print job is performed in Step S60, and a processing screen is displayed in Step S62. On the other hand, in a case where the No button is pressed by the user in Step S58, a print process of the print job is not performed, but a processing screen is displayed.

<Eighth Process Flow>

Figure 12:
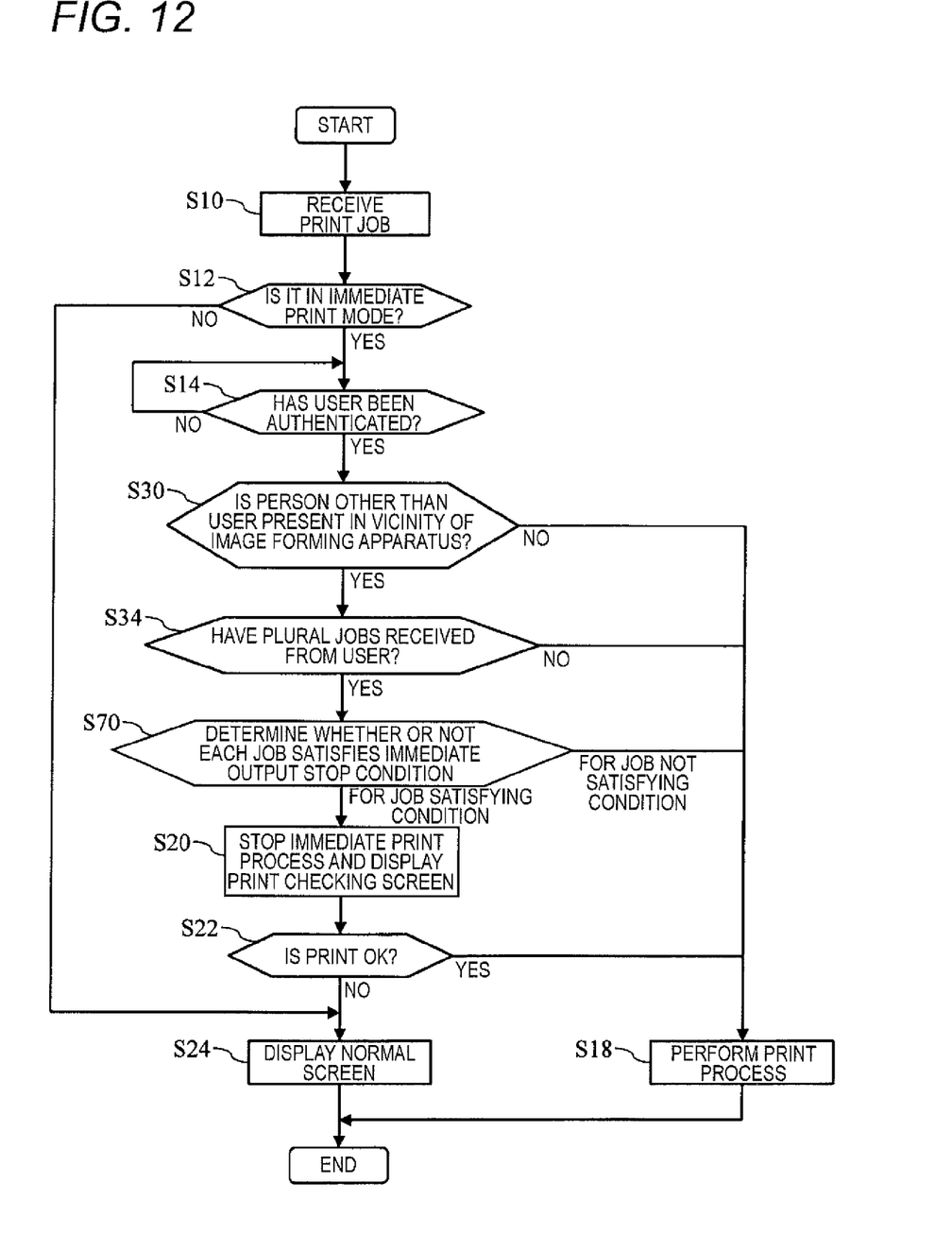
FIG. 12 is a flowchart that illustrates the process flow of an eighth process flow.

An eighth process flow illustrated in FIG. 12 is a modified example of the third process flow illustrated in FIG. 7. In the third process flow, in a case where plural print jobs in which the immediate print mode is designated are input, the immediate print processes of the plural print jobs are stopped, and a print job to be output is selected by the user. However, in the eighth process flow, it is determined whether or not each of the plural print jobs in which the immediate print mode is designated satisfies an immediate output stop condition, the immediate print process is stopped for each print job satisfying the immediate output stop condition, and the immediate print process of each print job not satisfying the immediate output stop condition is performed.

In the eighth process flow, up to Step S34, a process similar to that of the third process flow is performed. In Step S70, the printer control unit 26 determines whether or not each of the plural input print jobs satisfies the immediate output stop condition. For example, in a case where a condition that "a person (other person) other than a user who has input the print job is detected in the vicinity of the image forming apparatus 10 by the person detecting unit 24, and the security level of the print job detected by the printer control unit 26 is a predetermined level or more" is set as the immediate output stop condition, the printer control unit 26 determines whether or not the security level of each print job is a predetermined level by referring to the attribute data of each print job.

For a print job determined to satisfy the immediate output stop condition in Step S70, in Step S20, the immediate print process of the print job is stopped, and a print checking screen is displayed. In a case where there are plural print jobs determined to satisfy the immediate output stop condition, the print checking screen may be a screen for selecting the plural input print jobs. For a print job determined not to satisfying the immediate output stop condition in Step S70, the process proceeds to Step S18, and the immediate print process of the print job is performed.

As above, while the exemplary embodiment of the present invention has been described, the present invention is not limited to the exemplary embodiment described above, but various changes can be made in a range not departing from the concept of the present invention.

For example, in this exemplary embodiment, while the information processing apparatus is the image forming apparatus 10, the information processing apparatus may be a computer that is remotely operated using VNC (Virtual Network Computing). The VNC is a technology for displaying an image designated in a user terminal on a display unit of a computer that is remotely disposed.

In a case where an image is displayed on a display unit of a computer from a user terminal by using the VNC, a display instruction for displaying the image on the display unit is input to the computer from the user terminal as an output request. According to the present invention, even in a case where an image is designated to be immediately output to the display unit of the computer from the user terminal, for example, in a case where any other person other than a user who has input the display instruction is present in the vicinity of the computer, the immediate output of the image to the display unit of the computer can be stopped. In this case, similar to the exemplary embodiment described above, a checking display screen asking the user terminal to display the image on the display unit of the computer or not may be displayed.

The foregoing description of the exemplary embodiments of the present invention has been provided for the purposes of illustration and description. It is not intended to be exhaustive or to limit the invention to the precise forms disclosed, Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising: a specifying unit that specifies an operator who inputs an output request for outputting an output object; an output control unit that controls an output process in accordance with the output request; and printer control unit that detects an immediate output stop condition based on (i) detecting a presence/absence of a person other than the operator in the vicinity of the information processing apparatus and (ii) determining an attribute of an output request, wherein when the immediate output stop condition is detected, the output control unit stops the immediate output process of the output request even if the operator is specified; and the operator instructs the output control unit to perform the output request.

2. The information processing apparatus according to claim 1, wherein the printer control unit includes a person detecting unit that detects a person other than the operator present in the vicinity of the information processing apparatus, and
wherein the immediate output stop condition includes a condition that a person other than the operator is detected by the person detecting unit.

3. The information processing apparatus according to claim 2, wherein the printer control unit further includes a processing amount detecting unit that detects a processing amount of the output process in accordance with the output request as the attribute of the output request, and
wherein the immediate output stop condition includes a condition that a person other than the operator is detected by the person detecting unit and the processing amount detected by the processing amount detecting unit is a predetermined processing amount or more.

4. The information processing apparatus according to claim 2, wherein the printer control unit further includes a secrecy detecting unit that detects a degree of secrecy of the output request as the attribute of the output request, and
wherein the immediate output stop condition includes a condition that a person other than the operator is detected by the person detecting unit and the degree of secrecy detected by the secrecy detecting unit is a predetermined value or more.

5. The information processing apparatus according to claim 1, wherein the printer control unit includes an elapsed time measuring unit that measures an elapsed time after input of the output request as the attribute of the output request, and
wherein the immediate output stop condition includes a condition that the elapsed time measured by the elapsed time measuring unit is a predetermined time or more.

6. The information processing apparatus according to claim 1, further comprising:
a display unit that displays an output checking screen used for asking the operator whether or not the output request is output on a display section in a case where the output control unit stops the immediate output process of the output request.

7. An information processing method comprising: specifying an operator who inputs an output request for outputting an output object from an information processing apparatus; detecting an immediate output stop condition based on (i) detecting a presence/absence of a person other than the operator in the vicinity of the information processing apparatus and (ii) determining an attribute of the output request; and stopping an immediate output process of the output request once the immediate output stop condition is detected even if the operator is specified; and an instruction to perform the output request is provided by the operator.

8. A non-transitory computer readable medium storing a program causing a computer to execute information processing, the information processing comprising: specifying an operator who inputs an output request for outputting an output object from an information processing apparatus; detecting an immediate output condition based on ( ) detecting a presence/absence of a person other than the operator in the vicinity of the information processing apparatus and (ii) determining an attribute of the output request; and stopping an immediate output process of the output request once the immediate output stop condition is detected even if the operator is specified; and an instruction to perform the output request is provided by the operator.

* * * * *